(12) United States Patent
Shoshi et al.

(10) Patent No.: US 6,773,835 B2
(45) Date of Patent: Aug. 10, 2004

(54) FILM FOR OPTICAL APPLICATIONS

(75) Inventors: Satoru Shoshi, Koshigaya (JP); Yutaka Onozawa, Kawagoe (JP); Shigenobu Maruoka, Tatuno (JP)

(73) Assignee: Lintec Corporation, Tokyo (JP)

( * ) Notice: Subject to any disclaimer, the term of this patent is extended or adjusted under 35 U.S.C. 154(b) by 19 days.

(21) Appl. No.: 10/134,779

(22) Filed: Apr. 29, 2002

(65) Prior Publication Data

US 2002/0187324 A1 Dec. 12, 2002

(30) Foreign Application Priority Data

May 18, 2001 (JP) ........................................ 2001-149066

(51) Int. Cl.$^7$ ................................................. B32B 9/00
(52) U.S. Cl. ........................ 428/697; 428/220; 428/332; 428/334; 428/335; 428/336; 428/688; 428/689; 428/702; 428/913; 359/585; 359/586
(58) Field of Search ................................ 428/220, 332, 428/334, 335, 336, 688, 689, 697, 702, 913; 359/585, 580, 586

(56) References Cited

U.S. PATENT DOCUMENTS

| | | | |
|---|---|---|---|
| 6,104,530 A | 8/2000 | Okamura et al. | |
| 6,436,541 B1 | 8/2002 | Sopko et al. | |
| 6,480,250 B1 | 11/2002 | Matsufuji et al. | |
| 2002/0110692 A1 | * | 8/2002 | Suzuki et al. |
| 2002/0127408 A1 | * | 9/2002 | Nishida et al. |
| 2002/0176169 A1 | | 11/2002 | Shoshi et al. |
| 2003/0118532 A1 | * | 6/2003 | Taniguchi et al. |

\* cited by examiner

Primary Examiner—Deborah Jones
Assistant Examiner—Wendy Boss
(74) Attorney, Agent, or Firm—Frishauf, Holtz, Goodman & Chick, P.C.

(57) ABSTRACT

A film for optical applications comprising (A) a hard coat layer which comprises a resin cured by an ionizing radiation, (B) a high refractivity layer which comprises a resin cured by an ionizing radiation and at least two metal oxides comprising tin oxide doped with antimony and has a refractive index in a range of 1.65 to 1.80 and (C) a low refractivity layer which comprises a siloxane-based polymer and has a refractive index in a range of 1.37 to 1.47, layers (A) to (D) each having a specific thickness and being successively laminated at least on one face of a substrate film. The film exhibits an excellent property for preventing reflection of light and excellent scratch resistance and can be produced at a low cost.

24 Claims, No Drawings

FILM FOR OPTICAL APPLICATIONS

BACKGROUND OF THE INVENTION

1. Field of the Invention

The present invention relates to a film for optical applications and, more particularly, to a film for optical applications which effectively prevents reflection of light at the surface of image display devices such as plasma displays (PDP), cathode ray tubes (CRT) and liquid crystal displays (LCD), exhibits excellent scratch resistance and can be produced at a low cost.

2. Description of Related Art

When a display device such as PDP, CRT and LCD is used, light from the outside is occasionally reflected at the surface of the display and difficulty arises in watching images on the display. In particular, as the size of flat panel displays increases recently, solving the above problem is becoming more important.

To solve the above problem, various treatments for preventing reflection of light and anti-glare treatments have been made on various display devices. As one of such treatments, a film for preventing reflection of light is used for various display devices.

The film for preventing reflection of light has heretofore been prepared in accordance with a dry process such as vapor deposition and sputtering. A thin film of a substance having a low refractive index such as $MgF_2$ is formed on a substrate film or layers of a substance having a high refractive index such as ITO (indium oxide doped with tin) and $TiO_2$ and layers of a substance having a low refractive index such as $MgF_2$ and $SiO_2$ are alternately laminated. However, the film for preventing reflection of light prepared in accordance with the dry process has a drawback in that the cost of production is high.

Recently, preparation of a film for preventing reflection of light in accordance with a wet process, i.e., a coating process, has been attempted. However, the film for preventing reflection of light prepared in accordance with the wet process has a drawback in that scratch resistance of the surface of the prepared film is inferior to that of the film prepared in accordance with the dry process.

SUMMARY OF THE INVENTION

The present invention has an object of providing a film for optical applications which effectively prevents reflection of light at the surface of image display devices such as PDP, CRT and LCD, exhibits excellent scratch resistance and can be produced at a low cost.

As the result of extensive studies by the present inventors on the film for preventing reflection of light which exhibits excellent property of preventing reflection of light and excellent scratch resistance and can be produced at a low cost, it was found that a film for preventing reflection of light which was formed by successively laminating a hard coat layer, a high refractivity layer, a low refractivity layer and, optionally, an antifouling layer each having a specific property and a specific thickness on a substrate film in accordance with a wet process could be used advantageously as the film for optical application achieving the above object. The present invention has been completed based on the knowledge.

The present invention provides:

(1) A film for optical applications comprising (A) a hard coat layer which comprises a resin cured by an ionizing radiation and has a thickness in a range of 2 to 20 μm, (B) a high refractivity layer which comprises a resin cured by an ionizing radiation and at least two metal oxides comprising tin oxide doped with antimony and has a refractive index in a range of 1.65 to 1.80 and a thickness in a range of 60 to 160 nm and (C) a low refractivity layer which comprises a siloxane-based polymer and has a refractive index in a range of 1.37 to 1.47 and a thickness in a range of 80 to 180 nm, layers (A) to (C) being successively laminated at least on one face of a substrate film;

(2) A film described in (1), wherein the hard coat layer of layer (A) is a hard coat layer having an anti-glare property;

(3) A film described in any one of (1) and (2), wherein, in the high refractivity layer of layer (B), a content of the tin oxide doped with antimony in an entire amount of the metal oxides is 25 to 90% by weight;

(4) A film described in any one of (1) to (3), wherein at least two metal oxides comprised in the high refractivity layer of layer (B) are mixed metal oxides comprising tin oxide doped with antimony and at least one metal oxide selected from titanium oxide and indium oxide doped with tin;

(5) A film described in any one of (1) to (4), wherein the low refractivity layer of layer (C) has an antistatic property; and (6) A film described in any one of (1) to (5), which further comprises (D) an antifouling coating layer disposed on layer (C).

DESCRIPTION OF THE PREFERRED EMBODIMENTS

The film for optical applications of the present invention is a film for preventing reflection of light which is prepared in accordance with a wet process and has a structure comprising (A) a hard coat layer, (B) a high refractivity layer, (C) a low refractivity layer and, optionally, (D) an antifouling layer disposed on layer (C), which are successively laminated at least on one face of a substrate film.

The substrate film used for the film for optical applications of the present invention is not particularly limited and can be suitably selected from conventional plastic films heretofore used as the substrate for films for preventing reflection of light in optical applications. Examples of the plastic film include films of polyesters such as polyethylene terephthalate, polybutylene terephthalate and polyethylene naphthalate, polyethylene films, polypropylene films, cellophane, diacetylcellulose films, triacetylcellulose films, acetylcellulose butyrate films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyether imide films, polyimide films, fluororesin films, polyamide films and acrylic resin films.

The substrate film may be transparent or translucent and may be colored or colorless. These properties of the substrate film can be suitably selected in accordance with the application. For example, when the film is used as a protective film of a liquid crystal display, a colorless transparent film is preferable as the substrate film.

The thickness of the substrate film is not particularly limited and suitably selected in accordance with the situation. The thickness is, in general, in the range of 15 to 250 μm and preferably in the range of 30 to 200 μm. One or both surfaces of the substrate film may be treated, for example, by oxidation or by a treatment of forming rough surfaces, where desired, so that adhesion with layers disposed on the surfaces is enhanced. Examples of the treatment of the surface by oxidation include the treatment by corona discharge, the treatment by chromic acid (a wet process), the treatment by flame, the treatment by heated air and the irradiation with ultraviolet light in the presence of ozone. Examples of the treatment of forming rough surfaces include the treatment by sand blasting and the treatment with a solvent. The surface treatment is suitably selected in accordance with the type of the substrate film. In general, the treatment by corona discharge is preferable from the standpoint of the effect and the operability. The substrate film may be treated by forming a primer on one or both faces thereof.

In the film for optical applications of the present invention, the hard coat layer of layer (A) comprising a resin cured by an ionizing radiation is disposed as the first layer at least on one surface of the substrate film. It is preferable that the hard coat layer has the anti-glare property. Therefore, the hard coat layer may further comprise various types of fillers providing the anti-glare property in combination with the resin cured by an ionizing radiation.

The hard coat layer can be formed, for example, by coating the substrate film with a coating fluid for forming the hard coat layer which comprises a compound curable by an ionizing radiation and, where desired, fillers providing the anti-glare property and a photopolymerization initiator to form a coating layer, followed by irradiating the formed coating layer by an ionizing radiation to cure the coating layer.

Examples of the above compound curable by an ionizing radiation include photopolymerizable prepolymers and/or photopolymerizable monomers. The photopolymerizable prepolymer include prepolymers of the radical polymerization type and prepolymers of the cationic polymerization type. Examples of the prepolymer of the radical polymerization type include prepolymers of polyester acrylates, prepolymers of epoxyacrylates, prepolymers of urethane acrylates and prepolymers of polyol acrylates. The prepolymer of a polyester acrylate can be obtained, for example, by obtaining a polyester oligomer having hydroxyl groups at both ends by condensation of a polyfunctional carboxylic acid with a polyhydric alcohol, followed by esterification of the hydroxyl groups in the obtained oligomer with (meth)acrylic acid; or by obtaining an oligomer having hydroxyl groups at both ends by addition of an alkylene oxide to a polyfunctional carboxylic acid, followed by esterification of the hydroxyl groups of the obtained oligomer with (meth)acrylic acid. The prepolymer of an epoxyacrylate can be obtained, for example, by esterification of oxirane rings in an epoxy resin of a bisphenol type or a novolak type having a relatively low molecular weight by the reaction with (meth)acrylic acid. The prepolymer of a urethane acrylate can be obtained, for example, by obtaining a polyurethane oligomer by the reaction of a polyether polyol or a polyester polyol with a polyisocyanate, followed by esterification of the obtained oligomer with (meth)acrylic acid. The prepolymer of polyol acrylate can be obtained, for example, by esterification of hydroxyl groups in a polyether polyol with (meth)acrylic acid. The above photopolymerizable prepolymers may be used singly or in combination of two or more.

As the photopolymerizable prepolymer of the cationic polymerization type, in general, epoxy resins are used. Examples of the epoxy resin include compounds obtained by epoxidation of polyhydric phenols such as bisphenol resins and novolak resins with epichlorohydrin and compounds obtained by oxidation of linear olefin compounds and cyclic olefin compounds with peroxides.

Examples of the photopolymerizable monomer include polyfunctional acrylates such as 1,4-butanediol di(meth) acrylate, 1,6-hexanediol di(meth)acrylate, neopentyl glycol di(meth)acrylate, polyethylene glycol di(meth)acrylate, neopentyl glycol adipate di(meth)acrylate, neopentyl glycol hydroxypivalate di(meth)acrylate, dicyclopentanyl di(meth) acrylate, dicyclopentenyl di(meth)acrylate modified with caprolactone, di(meth)acrylate of phosphoric acid modified with ethylene oxide, cyclohexyl di(meth)acrylate substituted with allyl group, isocyanurate di(meth)acrylate, trimethylolpropane tri-(meth)acrylate, dipentaerythritol tri(meth) acrylate, dipentaerythritol tri(meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta (meth)acrylate modified with propionic acid, dipentaerythritol hexa(meth)acrylate and dipentaerythritol hexa(meth) acrylate modified with caprolactone. The above photopolymerizable monomers may be used singly or in combination of two or more. The photopolymerizable monomer may be used in combination with the photopolymerizable prepolymer described above.

Examples of the photopolymerization initiator for the photopolymerizable prepolymers and the photopolymerizable monomers of the radical polymerization type, which is used where desired, include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropane-1-one, 1-hydroxycyclohexyl phenyl ketone, 2-methyl-1-[4-(methylthio)-phenyl]-2-morpholinopropane-1-one, 4-(2-hydroxyethoxy)phenyl 2-(hydroxy-2-propyl) ketone, benzophenone, p-phenylbenzophenone, 4,4'-diethylaminobenzophenone, dichlorobenzophenone, 2-methyl-anthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal and p-dimethylaminobenzoates. Examples of the photopolymerization initiator for the photopolymerizable prepolymers of the cationic polymerization type include compounds composed of oniums such as aromatic sulfonium ions, aromatic oxosulfonium ions and aromatic iodonium ions and anions such as tetrafluoroborates, hexafluorophosphates, hexafluoroantimonates and hexafluoroarsenates. The above photopolymerization initiators may be used singly or in combination of two or more. The amount is, in general, selected in the range of 0.2 to 10 parts by weight per 100 parts by weight of the photopolymerizable prepolymer, the photopolymerizable monomer or both compounds.

As the filler providing the anti-glare property which is used where desired, a filler can be suitably selected from fillers which are heretofore known as the fillers providing the anti-glare properties. Examples of the filler include silica particles having an average diameter of particles in the range of about 1.5 to 7 $\mu$m, aggregates of particles of colloidal silica with an amine compound which have an average diameter of particles in the range of about 0.5 to 10 $\mu$m and mixtures of silica particles having an average diameter of particles in the range of about 0.5 to 10 $\mu$m and fine particles of metal oxides having an average diameter of particles in the range of about 1 to 60 nm. The content of the filler in the hard coat layer can be suitably selected based on the consideration on the anti-glare property and the scratch resistance of the obtained film for optical applications.

The coating fluid for forming the hard coat layer used in the present invention can be prepared by adding to a suitable solvent the above compound curable by irradiation by an ionizing radiation and, where desired, the above filler, the above photopolymerization initiator and various additives such as antioxidants, ultraviolet light absorbents, light stabilizers, leveling agents and defoaming agents in each specific amount, followed by dissolving or dispersing the added components in the solvent.

Examples of the solvent used in the above preparation include aliphatic hydrocarbons such as hexane, heptane and cyclohexane, aromatic hydrocarbons such as toluene and xylene, halogenated hydrocarbons such as methylene chloride and ethylene chloride, alcohols such as methanol, ethanol, propanol and butanol, ketones such as acetone, methyl ethyl ketone, 2-pentanone and isophorone, esters such as ethyl acetate and butyl acetate and cellosolve solvents such as ethylcellosolve.

The concentration and the viscosity of the coating fluid thus prepared is not particularly limited as long as the coating fluid can be used for coating and can be suitably selected in accordance with the situation.

The prepared coating fluid is applied to one face of the substrate film in accordance with a conventional process such as the bar coating process, the knife coating process, the roll coating process, the blade coating process, the die coating process and the gravure coating process and a coating layer is formed. The formed coating layer is dried and cured by irradiation by an ionizing radiation and a hard coat layer is formed.

Examples of the ionizing radiation include ultraviolet light and electron beams. The ultraviolet light can be obtained by using a high voltage mercury lamp, a fusion H lamp or a xenon lamp. The electron beams can be obtained by using an electron beam accelerator. Among these ionizing radiations, ultraviolet light is preferable. When the electron beams are used, a cured film can be obtained without adding polymerization initiators.

The thickness of the hard coat layer thus formed is in the range of 2 to 20 μm. When the thickness is smaller than 2 μm, there is the possibility that scratch resistance of the film for optical applications is not sufficiently exhibited. When the thickness exceeds 20 μm, there is the possibility that cracks are formed in the hard coat layer. It is preferable that the thickness of the hard coat layer is in the range of 3 to 15 μm and more preferably in the range of 5 to 10 μm.

In the film for optical applications of the present invention, the refractive index of the hard coat layer is, in general, in the range of 1.47 to 1.60 and preferably in the range of 1.49 to 1.55.

In the film for optical applications of the present invention, a high refractivity layer of layer (B) is formed on the hard coat layer formed above.

The high refractivity layer of layer (B) described above comprises a resin cured by an ionizing radiation and at least two metal oxides comprising tin oxide doped with antimony (ATO) and has a refractive index in the range of 1.65 to 1.80 and a thickness in the range of 60 to 160 nm. When the refractive index is smaller than 1.65, it is difficult that the film for optical applications exhibiting the excellent property for preventing reflection of light is obtained and the object of the present invention is not achieved. It is difficult that a layer having a refractive index exceeding 1.80 is formed since the layer comprises ATO as the essential component. It is preferable that the refractive index is in the range of 1.70 to 1.75.

ATO described above is used for improving adhesion of the high refractivity layer of layer (B) with the low refractivity layer of layer (C) comprising a siloxane-based polymer which is disposed on layer (B). The content of ATO in the entire amount of the metal oxides in layer (B) is selected, in general, in the range of 25 to 90% by weight and preferably in the range of 40 to 80% by weight. When the content is smaller than 25% by weight, there is the possibility that adhesion between layer (B) and layer (C) is insufficient. When the content exceeds 90% by weight, it is difficult that layer (B) having the desired refractive index is obtained.

The other metal oxides used in combination with ATO described above are not particularly limited as long as a layer having a refractive index in the range of 1.65 to 1.80 is obtained when the thickness is in the range of 60 to 160 nm. Examples of the metal oxide include titanium oxide, indium oxide doped with tin (ITO), tantalum oxide and tin oxide. The metal oxide may be used singly or in combination of two or more. Metal oxides having a refractive index higher than that of ATO is preferable and titanium oxide and/or ITO are more preferable.

The content of the metal oxides comprising ATO in layer (B) is not particularly limited and can be suitably selected in accordance with the desired thickness and refractive index of layer (B). In general, the content is about 200 to 600 parts by weight per 100 parts by weight of the cured resin.

Layer (B) can be formed as described in the following. Into a suitable solvent, the compound curable by ionizing radiation, the metal oxides comprising ATO and, where desired, the photopolymerization initiator and various additives such as antioxidants, ultraviolet light absorbents, light stabilizers, leveling agents and defoaming agents are added in each specific amount. The added components are dissolved or dispersed in the solvent and a coating fluid is prepared. The obtained coating fluid is applied to the hard coat layer of layer (A) to form a coating layer and the formed coating layer is then cured by irradiation by an ionizing radiation to form the high refractivity layer of layer (B).

The compound curable by ionizing radiation, the photopolymerization initiator, the solvent used for preparation of the coating fluid, the process for applying the coating fluid and the ionizing radiation are the same as those described for preparation of the hard coat of layer (A).

In the present invention, it is advantageous that the formation of the hard coat layer of layer (A) and the high refractivity layer of layer (B) are conducted in accordance with the following process.

The coating fluid for forming the hard coat layer is applied to one face of the substrate film to form a coating layer and the formed coating layer is cured to an intermediately cured condition by irradiation by an ionizing radiation. When ultraviolet light is used as the ionizing radiation, the amount of the radiation is, in general, in the range of about 50 to 150 mJ/cm$^2$. To the cured layer in the condition of an intermediate curing, the coating fluid for forming layer (B) is applied and a coating layer is formed. The formed layers are irradiated sufficiently by the ionizing radiation and layers (A) and (B) are completely cured. When ultraviolet light is used as the ionizing radiation, the amount of the irradiation is, in general, in the range of 400 to 1,000 mJ/cm$^2$.

As described above, the hard coat layer of layer (A) and the high refractivity layer of layer (B), which exhibit excellent adhesion between layer (A) and layer (B), are formed successively on the substrate film.

In the film for optical applications of the present invention, the low refractivity layer of layer (C) is formed on the high refractivity layer of layer (B) which has been formed as described above. The low refractivity layer comprises a siloxane-based polymer and has a refractive index in the range of 1.37 to 1.47 and a thickness in the range of 80 to 180 nm. When the refractive index or the thickness is outside the above range, it is difficult that the film for optical applications exhibiting the excellent property for preventing reflection of light and the excellent scratch resistance is obtained.

Examples of the layer comprising the siloxane-based polymer include layers comprising inorganic silica-based compounds (including polysilicic acid), layers comprising polyorganosiloxane-based compounds and layers comprising mixture of these compounds. The inorganic silica-based compounds and the polyorganosiloxane-based compounds can be produced in accordance with conventional processes.

For example, a process of partially or completely hydrolyzing and polycondensing an alkoxysilane compound represented by general formula [1]:

$$R^1_n Si(OR^2)_{4-n} \qquad [1]$$

using an inorganic acid such as hydrochloric acid and sulfuric acid or an organic acid such as oxalic acid and acetic acid is preferable. In general formula [1], $R^1$ represents a group which is not hydrolyzed such as an alkyl group; a substituted alkyl group, the substituent being a halogen atom, hydroxyl group, thiol group, epoxy group or (meth)acryloyloxy group; an alkenyl group; an aryl group; and aralkyl group. $R^2$ represents a lower alkyl group and n represents 0 or an integer of 1 to 3. A plurality of $R^1$ may represent the same group or different groups when the plurality of $R^1$ is present and a plurality of $OR^2$ may represent the same group or different groups when the plurality of $OR^2$ is present.

When a tetraalkoxysilane, i.e., a compound represented by general formula [1] in which n represents 0, is completely hydrolyzed, inorganic silica-based compounds are obtained. When a tetraalkoxy-silane is partially hydrolyzed, polyorganosiloxane-based compounds or a mixture of inorganic silica-based compounds and polyorganosiloxane-based compounds is obtained. When a compound represented by general formula [1] in which n represents 1 to 3 is partially or completely hydrolyzed, polyorganosiloxane-based compounds are obtained since such a compound has a group which is not hydrolyzed. A suitable solvent may be used for the hydrolysis so that the hydrolysis can be conducted uniformly.

Examples of the alkoxysilane compound represented by general formula [1] include tetramethoxysilane, tetraethoxysilane, tetra-n-propoxysilane tetraisopropoxysilane, tetra-n-butoxysilane, tetra-isobutoxysilane, tetra-sec-butoxysilane, tetra-tert-butoxysilane, methyltrimethoxysilane, methytriethoxysilane, methyltripropoxysilane, methyltriisopropoxysilane, ethyltrimethoxysilane, ethyltriethoxysilane, propyltriethoxysilane, butyltrimethoxysilane, phenyltrimethoxysilane, phenyltriethoxysilane, γ-glycidoxypropyltrimethoxysilane, γ-acryloyloxypropyltrimethoxysilane, γ-methacryloyloxypropyltrimethoxysilane, dimethyldimethoxysilane, methylphenyldimethoxysilane, vinyl-trimethoxysilane, vinyltriethoxysilane, divinyldimethoxysilane, divinyldiethoxysilane, trivinylmethoxysilane and trivinylethoxysilane. The alkoxysilane compound may be used singly or in combination of two or more.

In the above process, where necessary, an aluminum compound such as aluminum chloride and a trialkoxyaluminum may be added in a suitable amount.

As another process, using a silicon compound such as sodium meta-silicate, sodium ortho-silicate and water glass (a mixture of sodium silicates) as the raw material, the silicon compound may be hydrolyzed with an acid such as hydrochloric acid, sulfuric acid and nitric acid or a metal compound such as magnesium chloride and calcium sulfate. Free silicic acid is formed by the hydrolysis. This compound is easily polymerized and a mixture of linear compounds, cyclic compounds and network compounds is obtained. The composition of the mixture is different depending on the type of the material. Polysilicic acid obtained from water glass contains as the major components compounds having linear structures represented by general formula [2]:

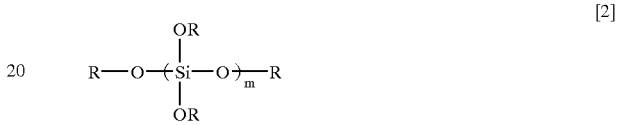

wherein m represents the degree of polymerization and R represents hydrogen atom, silicon atom or a metal atom such as magnesium atom and aluminum atom.

Completely inorganic silica-based compounds can be obtained as described above. As the inorganic silica-based compound, silica gel ($SiO_x \cdot nH_2O$) can also be used.

The low refractivity layer of layer (C) can be formed by applying a coating fluid comprising the siloxane-based polymer or a precursor thereof to the high refractivity layer of layer (B) in accordance with a conventional process such as the bar coating process, the knife coating process, the roll coating process, the blade coating process, the die coating process and the gravure coating process to form a coating layer, followed by a heating treatment.

In the low refractivity layer comprising the siloxane-based polymer thus formed, it is preferable that the siloxane-based polymer has silanol group or other hydrophilic groups since the antistatic property is provided and attachment of dusts to the obtained film for optical applications can be suppressed.

In the film for optical applications of the present invention, where desired, (D) an antifouling coating layer can be disposed on the low refractivity layer of layer (C). The antifouling coating layer can be formed, in general, by applying a coating fluid comprising a fluororesin to the low refractivity layer of layer (C) in accordance with a conventional process such as the bar coating process, the knife coating process, the roll coating process, the blade coating process, the die coating process and the gravure coating process to form a coating layer, followed by a drying treatment.

The thickness of the antifouling coating layer is, in general, in the range of 1 to 10 nm and preferably in the range of 3 to 8 nm. By disposing the antifouling layer, the surface of the obtained film for optical applications is provided with an improved slipping property and fouling of the surface is suppressed.

In the film for optical applications of the present invention, an adhesive layer for adhering the film for optical applications to an adherend such as a liquid display device may be formed on the face of the substrate film opposite to the face having the hard coat layer. As the adhesive constituting the adhesive layer, an adhesive for optical applications such as an acrylic adhesive, a urethane adhesive and a silicone adhesive can be preferably used. The thickness of the adhesive layer is, in general, in the range of 5 to 100 µm and preferably in the range of 10 to 60 µm.

A release film may be disposed on the adhesive layer. Examples of the release film include release films prepared by coating paper such as glassine paper, coated paper and laminate paper or a plastic film with a release agent such as a silicone resin. The thickness of the release film is not particularly limited. In general, the thickness of the release film is in the range of 20 to 150 µm.

To summarize the advantages of the present invention, the film for optical applications of the present invention is prepared in accordance with the wet process, exhibits the excellent property for preventing reflection of light and the excellent scratch resistance, can be produced at a low cost and is advantageously used as a film for preventing reflection of light on image display devices such as PDP, CRT and LCD.

EXAMPLES

The present invention will be described more specifically with reference to examples in the following. However, the present invention is not limited to the examples.

The physical properties of the films for optical applications obtained in Examples and Comparative Examples were measured in accordance with the following methods.

(1) Bottom Reflectivity

The reflectivity was measured using a spectrophotometer [manufactured by SHIMADZU Corporation; UV-3101PC]. The reflectivity at the wavelength showing the lowest reflectivity was used as the bottom reflectivity.

(2) Scratch Resistance

The surface of a sample was rubbed with steel wool #0000 under a load of $9.8 \times 10^{-3}$ N/mm$^2$ in five reciprocal movements and the condition of the surface was visually observed. When no scratches were found on the surface, the result was evaluated as good. When scratches were found on the surface, the result was evaluated as poor.

Example 1

(1) The surface coated for enhancing adhesion of a polyethylene terephthalate (PET) film having a thickness of 188 µm [manufactured by TOYOBO Co., Ltd.; the trade name: A4100] was coated with an acrylic hard coating material (coating fluid) of the ultraviolet light curing type [manufactured by JSR Corporation; the trade name: DESOLITE KZ7224; the concentration of the solid components: 46% by weight] using a Mayer bar No. 12 in a manner such that the thickness of the film after being completely cured was 6 µm. After the formed layer was dried at 80° C. for 1 minute, the layer was irradiated with ultraviolet light in an amount of 80 mJ/cm$^2$ and cured into an intermediately cured condition and a hard coat layer was formed.

(2) To a mixture (the concentration of tin oxide doped with antimony: 50% by weight) of 100 parts by weight of a dispersion of titanium oxide [manufactured by DAINIPPON INK KAGAKU KOGYO Co., Ltd.; the trade name: TF-14D; the concentration of solid components: 10% by weight] and 100 parts by weight of a dispersion of tin oxide doped with antimony [manufactured by DAINIPPON INK KAGAKU KOGYO Co., Ltd.; the trade name: TA-01D; the concentration of solid components: 10% by weight] used as the metal oxides, 6.7 parts by weight of an acrylic resin curable with ultraviolet light [manufactured by DAINICHI SEIKA KOGYO Co., Ltd.; the trade name: SEIKA BEAM EXF-01L(NS); the concentration of solid components: 100%] was added. The obtained mixture was diluted with isobutyl alcohol so that the concentration of solid components in the entire mixture was adjusted to 3% by weight and a coating material (coating fluid) was prepared. Then, the hard coat layer in the intermediately cured condition formed in step (1) described above was coated with the coating material prepared above using a Meyer bar No. 4 so that the thickness of the film after being completely cured was 90 nm. After the formed layer was dried at 80° C. for 1 minute, the layer was irradiated with ultraviolet light in an amount of 680 mJ/cm$^2$ and cured and a high refractivity layer was formed. As described above, the hard coat layer having a refractive index of 1.51 and the high refractivity layer having a refractive index of 1.71 were successively formed on the PET film.

(3) The high refractivity layer formed in step (2) described above was coated with a siloxane-based antistatic agent [manufactured by COLCOAT Co., Ltd.; the trade name: COLCOAT P; the concentration of solid components: 2% by weight] using a Mayer bar No. 6 in a manner such that the thickness of the film after being heated was 120 nm. The formed layer was treated by heating at 130° C. for 2 minute and a low refractivity layer having a refractive index of 1.45 was formed.

The physical properties of the prepared film for optical applications are shown in Table 1.

The thickness of each coating layer was measured by using "MCPD-2000" manufactured by OTSUKA DENSHI Co., Ltd. and the refractive index was measured by using an Abbe refractometer manufactured by ATAGO Co., Ltd. The measurements were conducted in the same manner in the following Examples and Comparative Examples.

Example 2

A film for optical applications was prepared in accordance with the same procedures as those conducted in Example 1 except that the preparation of the coating material in step (2) of Example 1 was changed as described in the following. The physical properties of the prepared film for optical applications are shown in Table 1. The high refractivity layer had a thickness of 100 nm and a refractive index of 1.68.

<Preparation of a Coating Material>

To 100 parts by weight of a dispersion of indium oxide doped with tin [manufactured by DAINIPPON INK KAGAKU KOGYO Co., Ltd.; the concentration of solid components: 15% by weight] and 40 parts by weight of a dispersion of tin oxide doped with antimony [manufactured by ISHIHARA TECHNO Co., Ltd.; the trade name: SN-100P; a dispersion in isobutanol; the concentration of solid components: 30% by weight] used as tin oxide (the content of tin oxide doped with antimony: 44% by weight), 9 parts by weight of the acrylic resin of the ultraviolet light curing type [manufactured by DAINICHI SEIKA KOGYO Co., Ltd.; the trade name: SEIKA BEAM EXF-01L(NS)] described above was added. The resultant mixture was diluted with isobutyl alcohol so that the concentration of solid components was adjusted to 3% by weight and a coating material was prepared.

Example 3

A film for optical applications was prepared in accordance with the same procedures as those conducted in Example 1 except that, in step (3) of Example 1, the coating material was changed to a siloxane-based coating material containing fluorine [manufactured by SHIN'ETSU KAGAKU KOGYO Co., Ltd. the trade name: X-12-2138H; the concentration of solid components: 3% by weight] and the layer was formed by using a Mayer bar No. 4. The physical properties of the prepared film for optical applications are shown in Table 1. The low refractivity layer had a thickness of 110 nm and a refractive index of 1.40.

Example 4

A film for optical applications was prepared in accordance with the same procedures as those conducted in Example 1 except that, on the low refractivity layer formed in step (3) of Example 1, an antifouling layer was formed by coating with an antifouling coating material which was prepared by diluting a fluororesin "OPTOOL DSX [a trade name; manufactured by DAIKIN KOGYO Co., Ltd.; the concentration of solid components: 20% by weight] with a diluent specific for the fluororesin "DEMNAM SOLVENT" [a trade name; manufactured by DAIKIN KOGYO Co., Ltd.] using a Mayer bar No. 4 in a manner that the formed layer had a thickness of about 5 nm after being dried, followed by drying the coating layer. The physical properties of the prepared film for optical applications are shown in Table 1.

Example 5

A film for optical applications in which the hard coat layer had the anti-glare property was prepared in accordance with the same procedures as those conducted in Example 1 except that the preparation of the hard coating material in step (1) of Example 1 was changed as described in the following. The physical properties of the prepared film for optical applications are shown in Table 1.
<Preparation of a Hard Coating Material>
To 100 parts by weight of the hard coating material of the ultraviolet light curing type [manufactured by DAINICHI SEIKA KOGYO Co., Ltd.; the trade name: SEIKA BEAM EXF-01L(NS); the concentration of solid components: 100% by weight], 35 parts by weight of a hard coating material of the ultraviolet light curing type containing silica gel [manufactured by DAINICHI SEIKA KOGYO Co., Ltd.; the trade name: SEIKA BEAM EXF-01L(BS); the concentration of solid components: 100% by weight] was added. To the resultant mixture, propylene glycol monomethyl ether was added as the diluting solvent and the concentration of solid components was adjusted to 50% by weight.

The hard coat layer had a refractive index of 1.51.

Comparative Example 1

A film for optical applications was prepared in accordance with the same procedures as those conducted in Example 1 except that the preparation of the coating material in step (2) of Example 1 was changed as described in the following. The physical properties of the prepared film for optical applications are shown in Table 1. The high refractivity layer had a thickness of 85 nm and a refractive index of 1.74.
<Preparation of a Coating Material>
To 100 parts by weight of a dispersion of tin oxide [manufactured by DAINIPPON INK KAGAKU KOGYO Co., Ltd.; described above], 3.3 parts by weight of the acrylic resin of the ultraviolet light curing type "SEIKA BEAM EXF-01L(NS)" described above was added. The resultant mixture was diluted with isobutyl alcohol so that the concentration of solid components was adjusted to 3% by weight and a coating material was prepared.

Comparative Example 2

A film for optical applications was prepared in accordance with the same procedures as those conducted in Example 1 except that the preparation of the coating material in step (2) of Example 1 was changed as described in the following. The physical properties of the prepared film for optical applications are shown in Table 1. The high refractivity layer had a thickness of 95 nm and a refractive index of 1.67.
<Preparation of a Coating Material>
To 100 parts by weight of a dispersion of tin oxide doped with antimony [manufactured by DAINIPPON INK KAGAKU KOGYO Co., Ltd.; described above], 3.3 parts by weight of the acrylic resin of the ultraviolet light curing type "SEIKA BEAM EXF-01L(NS)" described above was added. The resultant mixture was diluted with isobutyl alcohol so that the concentration of solid components was adjusted to 3% by weight and a coating material was prepared.

Comparative Example 3

A film for optical applications was prepared in accordance with the same procedures as those conducted in Example 2 except that, in step (2) of Example 2, 330 parts by weight of a solution of a polyester resin [manufactured by TOYOBO Co., Ltd.; the trade name: VYRON 20SS; the concentration of solid components: 30% by weight] was used in place of 100 parts by weight of the acrylic resin of the ultraviolet light curing type "SEIKA BEAM EXF-01L(NS)", the solvent for dilution was changed to a mixed solvent containing toluene and methyl isobutyl ketone in relative amounts of 1:1 by weight and the high refractivity layer was formed by the heating treatment at 100° C. for 1 minute without the irradiation with ultraviolet light. The physical properties of the prepared film for optical applications are shown in Table 1. The high refractivity layer had a thickness of 90 nm and a refractive index of 1.73.

TABLE 1

| | Bottom reflectivity (%)/wavelength (nm) | Scratch resistance |
|---|---|---|
| Example 1 | 1.05/580 | good |
| Example 2 | 1.20/600 | good |
| Example 3 | 0.95/560 | good |
| Example 4 | 1.05/580 | good |
| Example 5 | 1.30/570 | good |
| Comparative Example 1 | 0.75/550 | poor |
| Comparative Example 2 | 1.60/590 | good |
| Comparative Example 3 | 1.00/610 | poor |

What is claimed is:

1. A film for optical applications comprising (A) a hard coat layer which comprises a resin cured by an ionizing radiation and has a thickness in a range of 2 to 20 $\mu$m, (B) a high refractivity layer which comprises a resin cured by an ionizing radiation and at least two metal oxides comprising tin oxide doped with antimony, the high refractivity layer having a refractive index in a range of 1.65 to 1.80 and a thickness in a range of 60 to 160 nm and (C) a low refractivity layer which comprises a siloxane-based polymer, the low refractivity layer having a refractive index in a range of 1.37 to 1.47 and a thickness in a range of 80 to 180 nm, layers (A) to (C) being successively laminated at least on one face of a substrate film.

2. A film according to claim 1, wherein the hard coat layer of layer (A) is a hard coat layer having an anti-glare property.

3. A film according to claim 1, wherein in the high refractivity layer of layer (B), a content of the tin oxide doped with antimony in an entire amount of the metal oxides is 25 to 90% by weight.

4. A film according to claim 2, wherein in the high refractivity layer of layer (B), a content of the tin oxide doped with antimony in an entire amount of the metal oxides is 25 to 90% by weight.

5. A film according to claim 1, wherein the at least two metal oxides comprised in the high refractivity layer of layer (B) are mixed metal oxides comprising tin oxide doped with antimony and at least one metal oxide selected from the group consisting of titanium oxide and indium oxide doped with tin.

6. A film according to claim 2, wherein the at least two metal oxides comprised in the high refractivity layer of layer (B) are mixed metal oxides comprising tin oxide doped with antimony and at least one metal oxide selected from the group consisting of titanium oxide and indium oxide doped with tin.

7. A film according to claim 3, wherein the at least two metal oxides comprised in the high refractivity layer of layer (B) are mixed metal oxides comprising tin oxide doped with antimony and at least one metal oxide selected from the group consisting of titanium oxide and indium oxide doped with tin.

8. A film according to claim 4, wherein the at least two metal oxides comprised in the high refractivity layer of layer (B) are mixed metal oxides comprising tin oxide doped with antimony and at least one metal oxide selected from the group consisting of titanium oxide and indium oxide doped with tin.

9. A film according to claim 1, wherein the low refractivity layer of layer (C) has an antistatic property.

10. A film according to claim 1, which further comprises (D) an antifouling coating layer disposed on layer (C).

11. A film according to claim 4, wherein the substrate film is a plastic film selected from the group consisting of polyethylene terephthalate film, polybutylene terephthalate film, polyethylene naphthalate film, polyethylene film, polypropylene film, cellophane, diacetylcellulose film, triacetylcellulose film, acetylcellulose butyrate film, polyvinyl chloride film, polyvinylidene chloride film, polyvinyl alcohol film, ethylene-vinyl acetate copolymer film, polystyrene film, polycarbonate film, polymethylpentene film, polysulfone film, polyether ether ketone film, polyether sulfone film, polyether imide film, polyimide film, fluororesin film, polyamide film and acrylic resin film.

12. A film according to claim 11, wherein the substrate film has a thickness of 15 to 250 μm.

13. A film according to claim 11, wherein the substrate film has a thickness of 30 to 200 μm.

14. A film according to claim 13, wherein the thickness of the hard coat layer is 3 to 15 μm and the refractive index of the hard coat layer is 1.47 to 1.60.

15. A film according to claim 13, wherein the thickness of the hard coat layer is 5 to 10 μm and the refractive index of the hard coat layer is 1.49 to 1.55.

16. A film according to claim 15, wherein the high refractivity layer has a refractive index of 1.70 to 1.75.

17. A film according to claim 16, wherein in the high refractivity layer (B), the content of tin oxide doped with antimony in an entire amount is 40 to 80% by weight.

18. A film according to claim 17, wherein an antifouling coating layer (D) is disposed on layer (C), said antifouling coating layer having a thickness of 1 to 10 nm.

19. A film according to claim 17, wherein the antifouling coating layer has a thickness of 3 to 8 nm.

20. A film according to claim 17, wherein the resin cured by an ionizing radiation of the hard coat layer of layer (A) and the high refractivity layer of layer (B) is formed by curing at least any one compound selected from the group consisting of a prepolymer of a polyester acrylate, a prepolymer of an epoxyacrylate, a prepolymer of a urethane acrylate, a prepolymer of a polyol acrylate and a polyfunctional acrylate.

21. A film according to claim 20, wherein the siloxane-based polymer of the low refractivity layer of layer (C) is at least one polymer selected from the group consisting of a polymer obtained by partially or completely hydrolyzing and polycondensing an alkoxysilane compound represented by the formula (1):

wherein $R^1$ represents a functional group which is not hydrolyzed and is selected from the group consisting of an unsubstituted alkyl group; a substituted alkyl group, the substituent of the alkyl group being selected from the group consisting of a halogen atom, a hydroxyl group, a thiol group, an epoxy group and a (meth)acryloyloxy group; an alkenyl group; an aryl group and an aralkyl group, $R^2$ represents a lower alkyl group and n represents 0 or an integer of 1 to 3, a plurality of $R^1$ represents the same group or different groups when a plurality of $R^1$ is present; and a plurality of $OR^2$ represents the same group or different groups when a plurality of $OR^2$ is present, and a polymer obtained by hydrolysis followed by polymerization of at least one compound selected from the group consisting of sodium metasilicate, sodium orthosilicate and water glass.

22. A film according to claim 21, wherein the siloxane-based polymer of the low refractivity layer of layer (C) is a polymer obtained by partially or completely hydrolyzing and polycondensing an alkoxysilane compound represented by the formula (1):

wherein $R^1$ represents a functional group which is not hydrolyzed and is selected from the group consisting of an unsubstituted alkyl group; a substituted alkyl group, the substituent of the alkyl group being selected from the group consisting of a halogen atom, a hydroxyl group, a thiol group, an epoxy group and a (meth)acryloyloxy group; an alkenyl group; an aryl group and an aralkyl group, $R^2$ represents a lower alkyl group and n represents 0 or an integer of 1 to 3, a plurality of $R^1$ represents the same group or different groups when a plurality of $R^1$ is present; and a plurality of $OR^2$ represents the same group or different groups when a plurality of $OR^2$ is present.

23. A film according to claim 22, wherein the resin cured by an ionizing radiation of the hard coat layer of layer (A) and the high refractivity layer of layer (B) is formed by curing a polyfunctional acrylate.

24. A film according to claim 23, wherein the substrate film is a polyethylene terephthalate film.

* * * * *

UNITED STATES PATENT AND TRADEMARK OFFICE
CERTIFICATE OF CORRECTION

PATENT NO.         : 6,773,835 B2
APPLICATION NO. : 10/134779
DATED              : August 10, 2004
INVENTOR(S)       : Satoru Shoshi et al.

It is certified that error appears in the above-identified patent and that said Letters Patent is hereby corrected as shown below:

Title Page, item (56) References Cited under U.S. PATENT DOCUMENTS, insert:

-- 6,502,943 B2      1/2003      Nakamura et al.
   6,254,996 B1      7/2001      Fukuda et al.
   2003/0104188 A1   6/2003      Shoshi et al. --

Signed and Sealed this

Fifteenth Day of January, 2008

JON W. DUDAS
*Director of the United States Patent and Trademark Office*